United States Patent [19]

Wedgwood

[11] 4,215,835
[45] Aug. 5, 1980

[54] ARM NET SYSTEM FOR EJECTION SEATS

[76] Inventor: Gordon J. Wedgwood, 36, Sandy La., Little Sandhurst, Crowthorne, Berkshire, England

[21] Appl. No.: 909,152

[22] Filed: May 24, 1978

[51] Int. Cl.² .............................................. B64D 25/10
[52] U.S. Cl. ............................ 244/122 AG; 244/141; 297/466
[58] Field of Search ........ 244/122 R, 122 A, 122 AE, 244/122 AG, 122 AH, 121, 141; 297/384, 390, 464, 466

[56] References Cited

U.S. PATENT DOCUMENTS

| | | | |
|---|---|---|---|
| 3,083,938 | 4/1963 | Brinkworth et al. | 244/122 AH |
| 4,081,156 | 3/1978 | Ideskar | 244/122 AG |

FOREIGN PATENT DOCUMENTS 2653369  6/1977  Fed. Rep. of Germany ... 244/122 AG

*Primary Examiner*—Barry L. Kelmachter
*Attorney, Agent, or Firm*—Joseph E. Rusz; Sherman E. Goldman

[57] ABSTRACT

A seat mounted arm restraint net system for restraining a crewman's arms during an ejection sequence wherein a pair of nets, mounted with one on each side of the seat, are deployable by separate static lines passing through snubber boxes to frangible anchorages on the vehicle floor. Each static line is releasably attached to a separate swinging arm rotatably secured to its seat side such that the swinging arms throw the free net sides laterally outwards and then release the nets to close over the crewman's arms.

13 Claims, 4 Drawing Figures

ARM NET SYSTEM FOR EJECTION SEATS

STATEMENT OF GOVERNMENT INTEREST

The invention described herein may be manufactured and used by or for the United States Government for governmental purposes without payment of any royalty thereon.

BACKGROUND OF THE INVENTION

This invention relates generally to ejector systems for ejecting personnel from the cockpits of vehicles and craft, such as aircraft, and more particularly to means for restraining the arms of the user during the ejection sequence so as to prevent injury thereto due to the forces encountered during the sudden exposure to the air while travelling at high speeds.

Various arm restraining systems are known which employ cords or tapes to reel in and restrain the arms during ejection from an aircraft. These form part of or have to be fitted to the wearer's clothing and have to be connected to and disconnected from the aircraft and/or seat upon entry and normal egress from the aircraft. Thus, an additional step is added to the number of operations which have to be performed before the aircraft can take off. It has also been suggested that seats, where the ejector handle is sited on the arm rests, be provided with automatic shackles to hold the forearms to the arm rests on operation of the handle. This suggestion has been unpopular psychologically and because of the difficulty of access to such manually operable devices as the seat/occupant manual separation and emergency air or oxygen supplies.

SUMMARY OF THE INVENTION

The invention comprises an arm restraint system which is seat mounted and has static lines which operate swinging arms which throw a net laterally outwards and then releases the nets to close over the occupant's arm.

Accordingly, it is an object of this invention to provide an arm restraint system which is seat mounted in order to avoid a connecting or disconnecting action required to be taken when a user occupies a seat and which does not require prefitting or special clothing.

It is another object of this invention to provide an arm restraint system which improves safety and does not hinder the occupant's ability to operate manually controlled devices.

It is still another object of this invention to provide an arm restraint system for restraining the arms of a user during an ejection sequence which comprises two nets attached and normally stowed on each side of an ejector seat, and means for deploying the nets at commencement of the ejection including net casting means operable to cast a side of the nets laterally outwards so that the nets encompass the user's elbows if the latter are outstretched sideways.

It is a further object of this invention to provide a restraining system having nets which may be concave, that is shaped like a hammock or sling, so that in use the user's arms may be somewhat enveloped thereby and be held in the net by inertia and air pressure. Preferably the net is anchored at one side thereof to back, and possibly also at another side thereof to arm rest, regions of the seat.

It is a still further object of the invention to provide a restraining system having a net deployment means which may include a line attached to a free side of each of a pair of nets and forming part of a static line releasably attachable, for example, by frangible means, to a fixed datum, e.g., the floor of the vehicle, and a snubber block through which the static line passes in a normally non-returnable manner. The nets may thus be substantially triangular and normally stowed in frangible or openable covers extending along the sides of the back rest portion of the seat, and along arm rest portions also. The upper end of each static line is advantageously anchored to a release unit associated with a seat release mechanism, both manual and automatic. The net can be arranged so that release of the unit is sufficient to ensure release of the arms from the nets, and mounted on a headrest structure on the seat. Alternatively, the whole attachment of the net to the seat can be releasable, using loops, fairleads and a draw thread. By anchoring the upper end to the headrest structure, however, the net can be arranged to support the whole arm and to restrain the user's corresponding shoulder as well. The anchorage of the static lines and the operation of the net casting means are preferably arranged so that the static lines and hence the associated free sides of the nets clear the shoulders during deployment. Insofar as controls and supplies, e.g., on manual seat/manual release and emergency air or oxygen supply, are not mounted so that the user can operate them from the restrained configuration, the snubber blocks may have a manual release. For faster deployment of the nets the static lines may pass through pulley means.

Another object of the invention is to provide a restraining system having net casting means which may include on each side an arm pivotally attached to the seat at one end and attached by releasable attachment means at the other end to the net outer side or the static line or both. It is normally stowed with the net end to the rear of the seat end. The arrangement is such that tension on the static line to deploy the net rotates the arm laterally outward with the line and associated net side. Then, at or just beyond the maximum cast of the net, the net and the line act to pull the associated net side inwards and forwards. The pivotal axis of the arm is preferably tilted laterally inward from the vertical so that the arm is inclined upwards at the point of maximum cast of the net, and may also be tilted forward of the vertical to encourage the released arm to continue to rotate forwards after release of the net.

Still another object of this invention is to provide a restraining system having nets of a mesh size, at least in a forward region thereof, small enough not to permit the user's fingers to pass therethrough and entangle in the net. The rear and upper regions of the nets may have a larger mesh but this should not be so large as to permit protrusion therethrough by, and entrapment thereby of, the user's elbows. Advantageously an ejection seat provided with arm restraint nets in accordance with the invention has knee wings, one each side protruding upwards from the forward region of the seat part of the seat, and to each of which is attached a fairlead for the static line. With this arrangement the user's arms can readily be supported with the hands not far from controls such as a manual seat release control and the snubber block release controls. The snubber blocks may, of course, be most conveniently mounted on the knee wings.

Arm restraint systems in accordance with the invention are particularly suitable for use on ejector seats whereon the ejection handle is sited on the front of the seat pan between the user's legs. As the operation of this handle terminates, the user's elbows are usually laterally spread out, and the arm tension the user requires to pull the handle may not have been relaxed before the ejection has got under way. The net system can readily be arranged to encompass the elbows in this position and to protect them while leaving the vehicle.

BRIEF DESCRIPTION OF THE DRAWINGS

An arm restraint system in accordance with the present invention will now be described by way of example with reference to the accompanying drawings, of which.

DESCRIPTION OF THE PREFERRED EMBODIMENT

Figure 1:
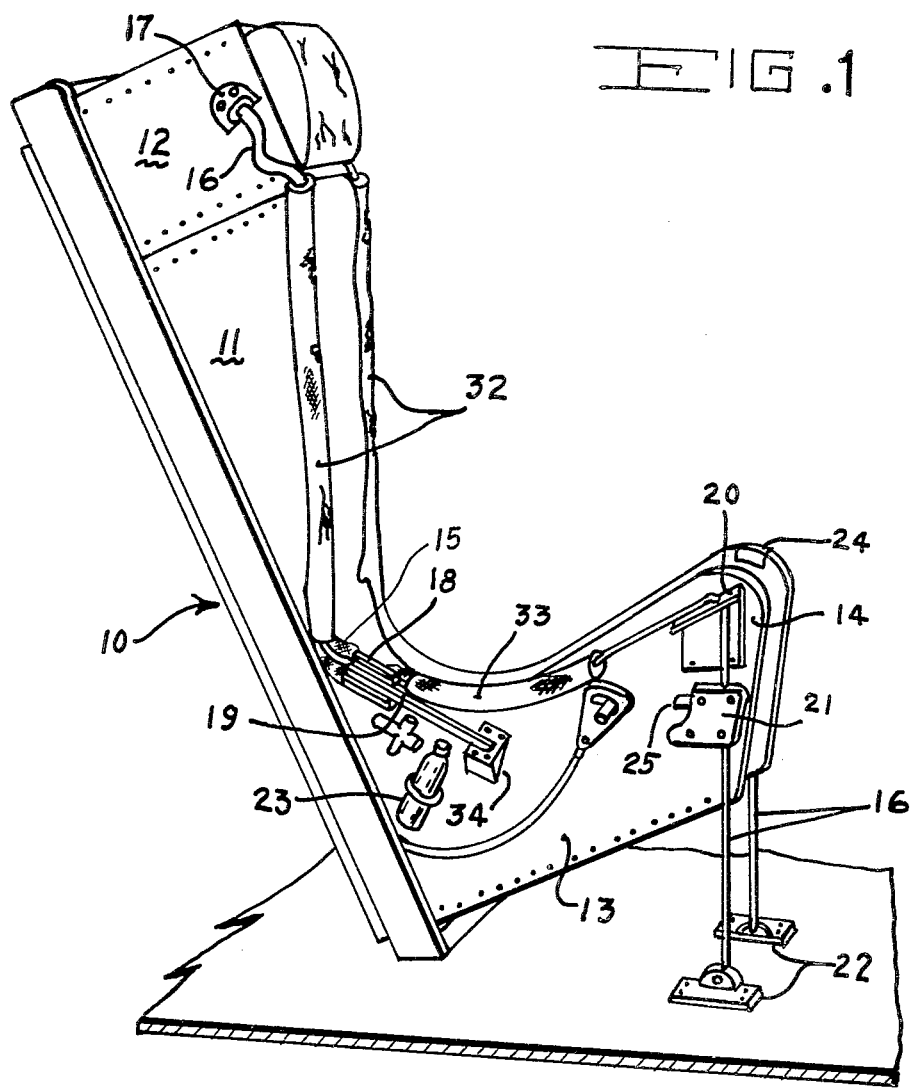
FIG. 1 illustrates the system in a stowed configuration.

An ejector seat 10 illustrated in the Figures has a back rest portion 11, a head rest portion 12, seat pan side portions 13 and knee wings 14. Two arm restraints 15 are attached to the back and side portions 11 and 13, one net at each side. The nets may be concave and generally triangularly shaped like a hammock or sling so that in use the user's arms may be somewhat enveloped thereby such that they are held in the net by inertia and air pressure. The lower and upper regions of the nets 15 may have a mesh size of 1 cm and 4 cm, respectively. The smaller mesh size should be small enough to prevent the user's fingers from passing therethrough and becoming entangled in the mesh. The larger mesh at the rear and upper regions of the nets should be small enough to avoid protrusion and entrapment of the user's elbows. The nets 15 are normally stored in tubular reinforced rubber fabric housings 32 and 33 which are attached to the seat back 11 and side portion 13, respectively, on each side of the seat. Alternatively, frangible housings or coverings may be substituted. The housings are split longitudinally to permit the nets 15 to be drawn out somewhat by their free edges.

Each net 15 is attached along its upper free edge to a static line 16, a top end of which is anchored to its release unit 17 on the side of the head rest portion 12. Along the lower end of the free edge of the net the static lines 16 carries a toggle 18 which in combination with toggle arm 19 provides net casting means. Thereafter the static line 16 passes through a fairlead or guide 20 and a snubber box 21 mounted on the knee wing 14 to a shear pin or other frangible element containing means 22 which is anchored to a fixed datum such as the floor of the vehicle.

The release unit 17 to which the upper end of the static line is anchored is associated with a seat release mechanism, operated either manually or automatically. Release of unit 17 would ensure release of the arms of a user from the nets 15 by detachment of lines 16. Alternatively, the entire attachment of the net to the seat could be releasable, e.g., by using loops, fairleads and a draw thread. The anchoring of the upper end of the static line 16 to the release unit 17 at the head rest structure allows the net to be arranged to support the entire arms and also to restrain the user's shoulders.

The snubber block 21 allows the static line 16 to pass therethrough in a normally non-returnable manner. In order to allow for release of the line from the box 21 a conventional override button 25 is provided which interrupts the snubber action while depressed to permit drawing back of the static line therethrough.

As is usual with ejection seats, an emergency oxygen supply and a manual emergency seat separation unit are provided. As shown in the Figures the emergency oxygen supply is indicated at 23 on the starboard side of the seat (FIG. 3) and the emergency manual seat separation unit is indicated schematically at 24 on the port side (FIG. 4).

Figure 2:
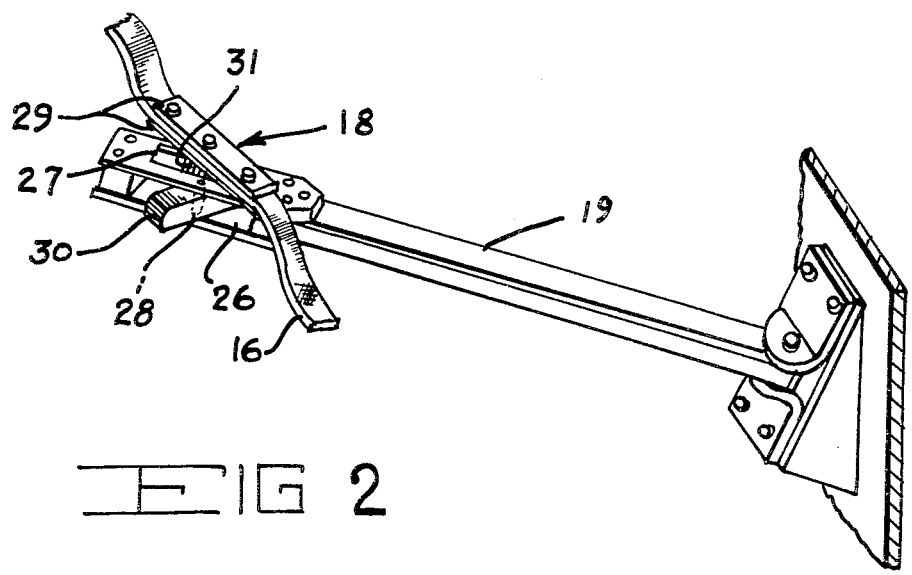
FIG. 2 is a diagram of a casting arm.

The means for deploying the nets at commencement of the ejection of the seats includes net casting means operable to cast sides of the nets in a laterally outward direction so that the nets encompass the user's elbows if the latter are outstretched laterally beyond the arm rests formed by side portion 13. The toggle arm 19 is pivotally mounted to an inclined plane 34 attached to the seat side portion 13 in such a manner that in stowed and outstretched positions it is upwardly inclined. As shown in FIG. 2 the arm 19 has a cavity 26 and slot 27 arrangement at its outer, free end for releasably holding the toggle 18. A pin 28 mounted on the arm 19, in the cavity, serves as a guide for the rotation and release of the toggle 18. The toggle comprises jaws 29 for attachment to the static line 16, a catchment bar 30 the breadth and length of which are slightly less than those of the slot 27 and the depth of which is slightly less than the breadth of the cavity 26, and a trunk 31 connecting the jaws 29 and the bar 30. There is a hole in the bar 30 and trunk 31 to accommodate the pin 28 as a slide fit. The long axis of the bar 30 is normal to that of the jaws and the static line 16. The arrangement is such that the cavity 26 and slot 27 arrangement on the arm 19 will retain the bar 30 of the toggle 18 until the maximum lateral flow of the arm 19 when the bar 30 is aligned with the slot 27. The tension in and configuration of the static line 16 will then cause the toggle to withdraw from the arm.

The operation of the restraint system is as follows. When the user pulls the ejection handle, the ejector seat begins to leave the floor of the vehicle. The static lines 16, being anchored to the floor, are pulled through the snubber boxes 21 and the fairleads 20 and the arm 19 is thereby swung outwardly and forwardly. The net 15 is thereby caused to break out of the housings 32, 33 and the free edge of the net is cast beyond the user's elbows.

Figure 3:
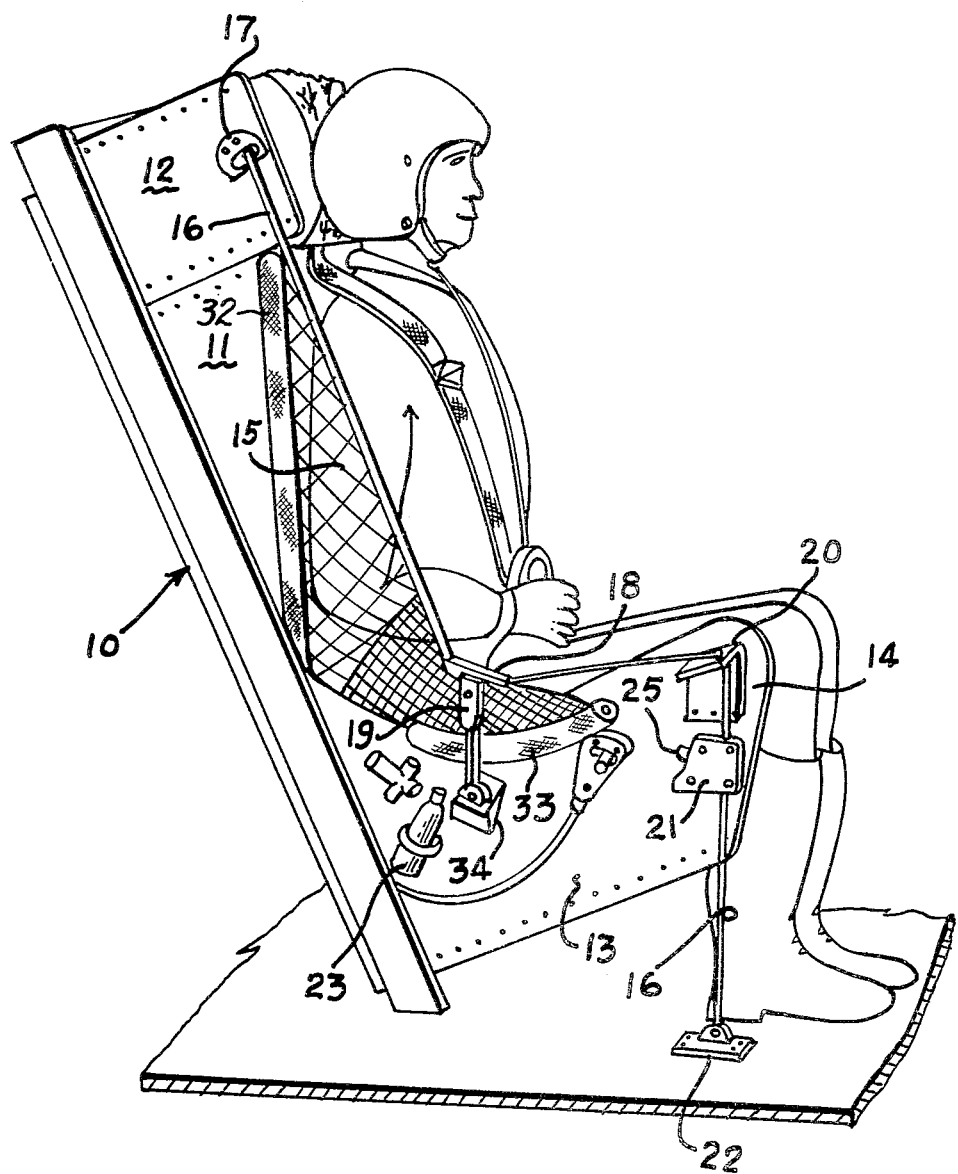
FIG. 3 illustrates the system in a maximum cast configuration.
Figure 4:
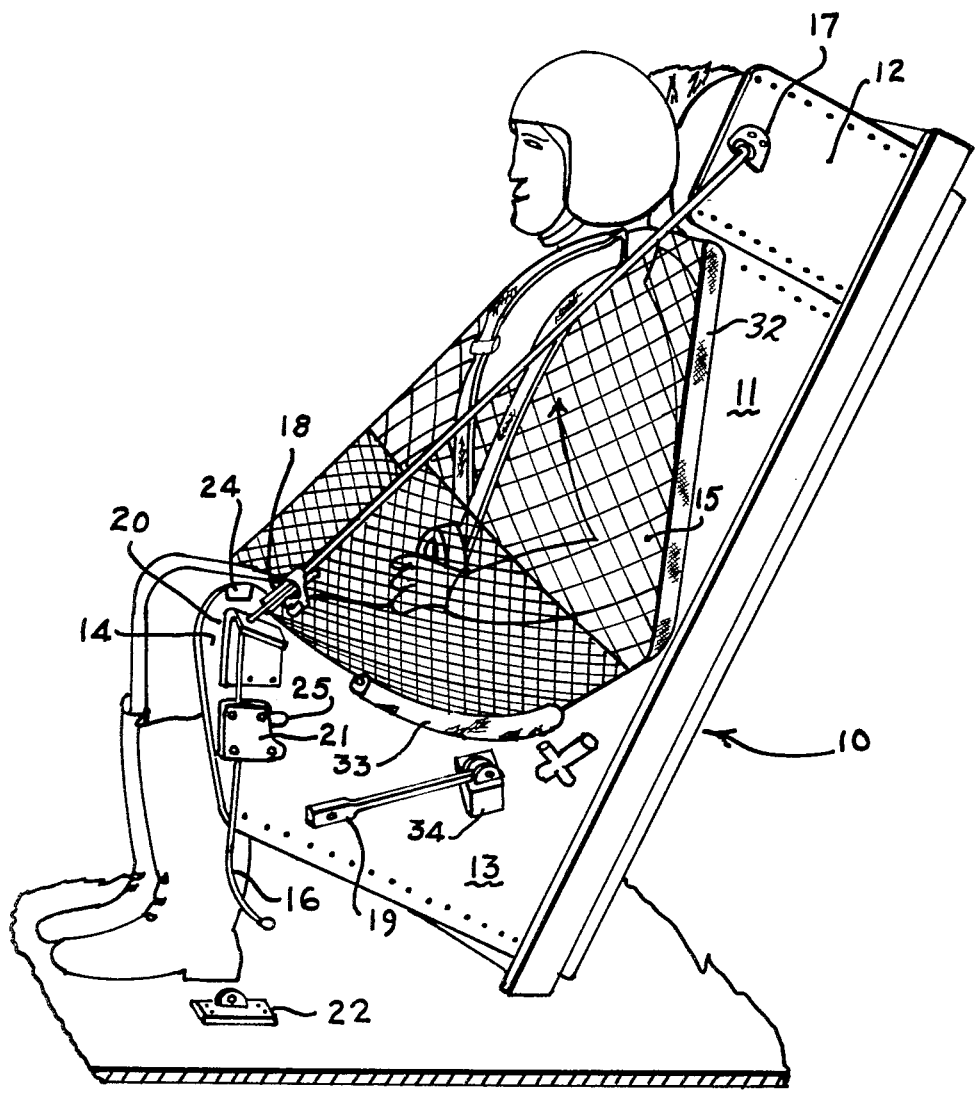
FIG. 4 illustrates the system in a fully deployed configuration.

At the position of maximum lateral throw of the arms 19 shown in FIG. 3 and thus of maximum cast of the net, the toggles 18 and hence the static lines 16 and the nets 15 are released from the arms 19 which continue their forward swing freely. The static lines then spring laterally inwards and, when they are taut, the shear pins of the release units 22 break. The static lines are kept taut then by the action of the snubber blocks 21.

The configuration will then be that illustrated in FIG. 4, with the static lines passing over the shoulders of the user, so that the net encompasses the upper and at least most of the lower parts of the user's arms.

If the user desires emergency oxygen he can operate a snubber release button 25 to free the starboard net and gain access to his emergency oxygen at 23.

When the automatic user/seat separation unit operates, the release units 17 are opened along with other user restraining device release units, the nets cease to encompass the arms, and unimpeded seat/user separation is allowed. If the automatic unit fails to operate, the manual release unit 24 can be operated from within the port side net.

Although the invention has been described with reference to a particular embodiment, it will be understood to those skilled in the art that the invention is capable of a variety of alternative embodiments within the spirit and scope of the appended claims, for example, means other than the relative movement between the seat and the vehicle, such as a driven capstan unit, could be used to effect the requisite pull on the static lines.

I claim:

1. A seat mounted arm restraint net system for restraining an ejection seat occupant's arm during a seat ejection sequence comprising
   a seat mounted for ejection from a vehicle, said seat having a back portion and a seat pan portion,
   a net having one side fixedly secured along its length to said seat proximate to each of said back portion and said seat pan portion, said net normally being in a stowed position,
   a static line attached to a free side of said net and having one end anchored to said seat and its other end capable of being releasably secured to a vehicle from which said seat is to be ejected, and
   means connected with said static line and net interjacent the ends of said free side of said net and operable to deploy said net to cast said free side of said net laterally outward from said seat and then inwardly toward said seat to encompass a seat occupant's arm.

2. A seat mounted arm restraint net system as defined in claim 1 including means on said seat for releasably securing said net in its stowed position.

3. A seat mounted arm restraint system as defined in claim 1 wherein the anchoring of said static line to said seat is releasable to allow for occupant disengagement from said net and egress from said seat.

4. A seat mounted arm restraint net system as defined in claim 1 including snubber means between said net and said other end of said static line for preventing movement of said line therethrough in one direction toward said seat, and
   means for releasing the snubbing action of said snubber means.

5. A seat mounted arm restraint net system as defined in claim 1 wherein the release of the securing of said other end of said static line is operable upon the obtaining of a predetermined force exerted upon said line as said seat is ejected.

6. A seat mounted arm restraint net system as defined in claim 1 where said last-mentioned means comprises a toggle secured to said static line, and
   a toggle arm releasably secured to said toggle at one end and inclined and pivotally mounted at its other end to said seat such that motion from a rearwardly directed position with respect to said seat causes an upward, forward, outward and then inward movement of said toggle with respect to said seat to cause the net secured to said static line to follow said movements to encompass a seat occupant's arms, said toggle being arranged to release from said toggle arm at a predetermined position of said toggle arm.

7. A seat mounted arm restraint net system for restraining an ejection seat occupant's arm during a seat ejection sequence comprising,
   a seat mounted for ejection from a vehicle, said seat having a back rest position, a head rest portion and seat pan side portions forming arm rests,
   a net having one side fixedly secured along its length to said seat at one side of said back rest portion and said seat pan side portion, said net normally being in a stowed position,
   a static line attached to a free side of said net and having one end anchored to said seat at the one side of said head rest portion and its other end capable of being releasably secured to a vehicle from which said seat is to be ejected, and
   means connected with said static line and net interjacent the ends of said free side of said net and operably by the ejection movement of said seat for deploying said net to cast said free side of said net laterally outward from said seat and then inwardly toward said seat to encompass a seat occupant's arm.

8. A seat mounted arm restraint net system as defined in claim 7 including means on said seat arm rest for releasably securing said net in its stowed position.

9. A seat mounted arm restraint system as defined in claim 7 wherein the anchoring of said static line to said seat at the side of said head rest portion is releasable to allow for occupant disengagement from said net and egress from said seat.

10. A seat mounted arm restraint net system as defined in claim 7 including snubber means between said net and said other end of said static line for preventing movement of said line therethrough in one direction toward said seat, and
    means for releasing the snubbing action of said snubber means.

11. A seat mounted arm restraint net system as defined in claim 7 wherein the release of the securing of said other end of said static line is operable upon the obtaining of a predetermined force exerted upon said line as said seat is ejected.

12. A seat mounted arm restraint net system as defined in claim 7 where said last-mentioned means comprises a toggle secured to said static line, and
    a toggle arm releasably secured to said toggle at one end and inclined and pivotally mounted at its other end to the said seat side portion such that motion from a rearwardly directed position with respect to said seat causes an upward, forward, outward and then inward movement of said toggle with respect to said seat to cause the net secured to said static line to follow said movements to encompass a seat occupant's arms, said toggle being arranged to release from said toggle arm at a predetermined position of said toggle arm.

13. A seat mounted arm restraint net system for restraining an ejection seat occupant's arm during a seat ejection sequence comprising,
    a seat mounted for ejection from a vehicle, said seat having a back portion and a seat pan portion,
    a net having one side fixedly secured along its length to said back portion and said seat pan portion, said net normally being in a stowed position,
    a static line attached to a free side of said net and having one end anchored to said seat and its other end secured to a means for exerting a pull on said static line, and
    means connected with said static line and net interjacent the ends of said free side of said net and operably to deploy said net to cast said free side of said net laterally outward from said seat and then inwardly toward said seat to encompass a seat occupant's arm.

* * * * *